Sept. 1, 1942.    H. J. NICHOLS    2,294,687
TELEGRAPH PRINTER
Original Filed Nov. 4, 1939    6 Sheets-Sheet 1

INVENTOR
Harry J. Nichols
BY
ATTORNEY

Sept. 1, 1942.　　　　H. J. NICHOLS　　　　2,294,687
TELEGRAPH PRINTER
Original Filed Nov. 4, 1939　　　6 Sheets-Sheet 2

INVENTOR
Harry J. Nichols
BY
ATTORNEY

Sept. 1, 1942.    H. J. NICHOLS    2,294,687
TELEGRAPH PRINTER
Original Filed Nov. 4, 1939    6 Sheets—Sheet 5

INVENTOR
Harry J. Nichols
BY
ATTORNEY

FIG. 30.

Patented Sept. 1, 1942

2,294,687

UNITED STATES PATENT OFFICE 2,294,687

TELEGRAPH PRINTER

Harry J. Nichols, Binghamton, N. Y., assignor to International Business Machines Corporation, New York, N. Y., a corporation of New York Original application November 4, 1939, Serial No. 302,877. Divided and this application November 29, 1940, Serial No. 367,714

11 Claims. (Cl. 197—49)

This invention relates to printing telegraphy and more particularly to novel shift mechanism for a printing telegraph receiving device wherein a message is recorded by characters formed upon a tape.

The invention embodies novel shift mechanism controlled conjointly by novel aggregate motion mechanism and by signal controlled means and is a division of applicant's copending application Serial No. 302,877, filed November 4, 1939, which has matured into Patent No. 2,275,641, issued March 10, 1942.

More specifically, the device embodying the invention comprises a receiver for printing telegraphy including accumulating mechanism and novel shift mechanism controlled by the accumulator mechanism and by means including the printing mechanism.

Similar devices of the prior art have required complicated shift mechanism controlled by means separate from the printing mechanism.

In view of the above conditions prevailing in the prior art, one of the objects of the present invention is to provide an extremely simple and efficient shift mechanism.

Another object is to provide in a telegraph receiver, novel shifting mechanism controlled by a printing element.

Still another object is to provide in a printing telegraph receiver, novel shifting means comprising simple means, movable in one direction to produce a simultaneous shifting movement at an angle to said direction, thereby providing shifting mechanism of extreme simplicity.

Other objects of the invention will be pointed out in the following description and claims and illustrated in the accompanying drawings, which disclose, by way of example, the principle of the invention and the best mode, which has been contemplated, of applying that principle.

Figure 1:
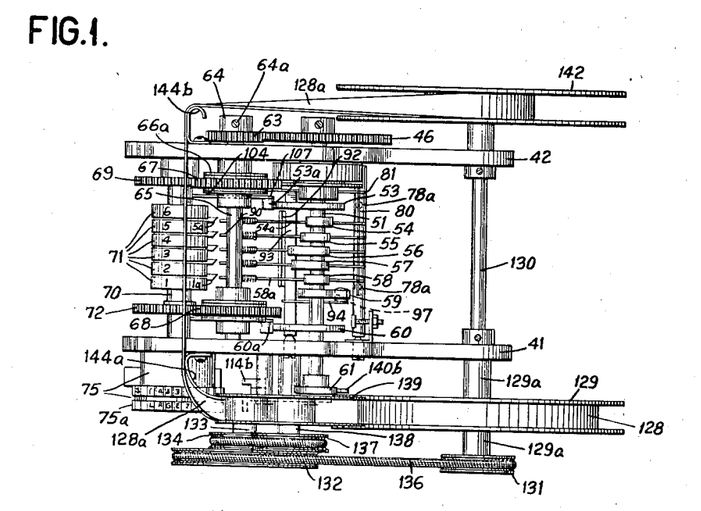
Fig. 1 is a plan view illustrating one embodiment of the invention.
Figure 2:
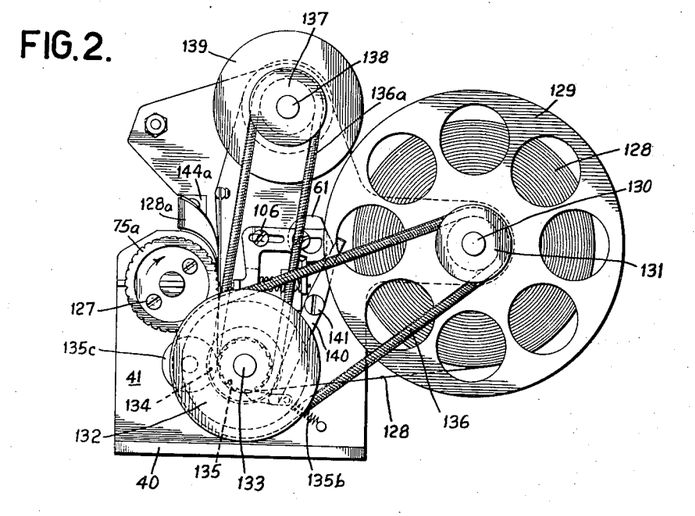
Fig. 2 is a front end elevation of the device as illustrated in Fig. 1.
Figures 3, 4, 5:
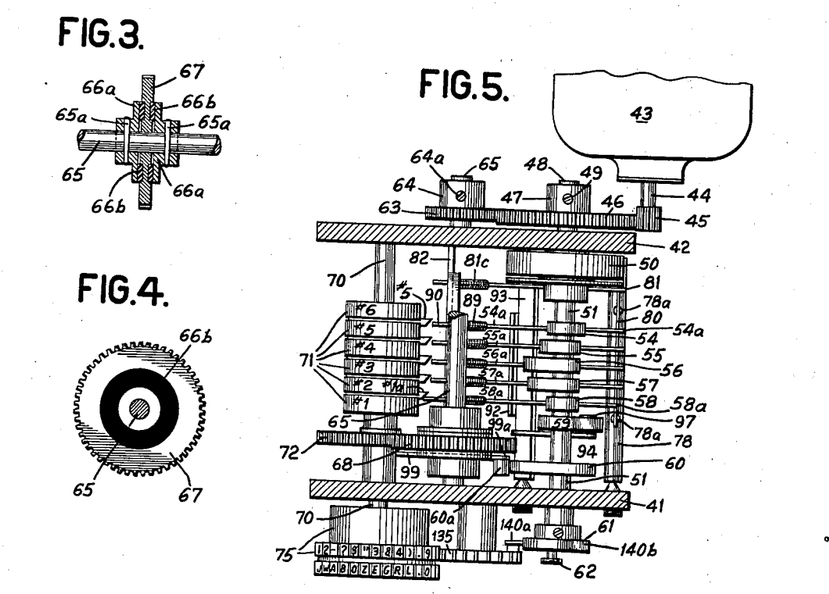
Fig. 3 is a detail side view of one of the frictional driving mechanisms of the device in Fig. 1.
Fig. 4 is an end view of the friction element of the mechanism as illustrated in Fig. 3.
Fig. 5 is a plan view, generally similar to Fig. 1, with certain parts omitted and others illustrated, to more clearly illustrate the operation of the device.

Referring to the drawings and more particularly to Figs. 1, 2 and 5, the receiver is mounted upon a base 40 carrying plates 41 and 42 in which are journaled the ends of the shafts supporting the several rotary elements.

A motor 43 (Fig. 5) is provided with a main power shaft 44 carrying a pinion 45 meshing with gear 46, provided with a hub 47. Gear 46 is fastened to a shaft 48 by a set screw 49 passing through the hub 47. Shaft 48 has attached thereto the driving element of the start-stop clutch 50, which may comprise any type of eccentric, positive action clutch. A start-stop shaft 51, journaled at one end by shaft 48 and at the other end by plate 41, is attached in any desired manner to the driven element 50a (Fig. 8) of the start-stop clutch 50. A stop pin 52 is mounted on the driven element 50a to control the rotation thereof and of the start-stop shaft in a manner that will be discussed in detail later.

Figure 20:
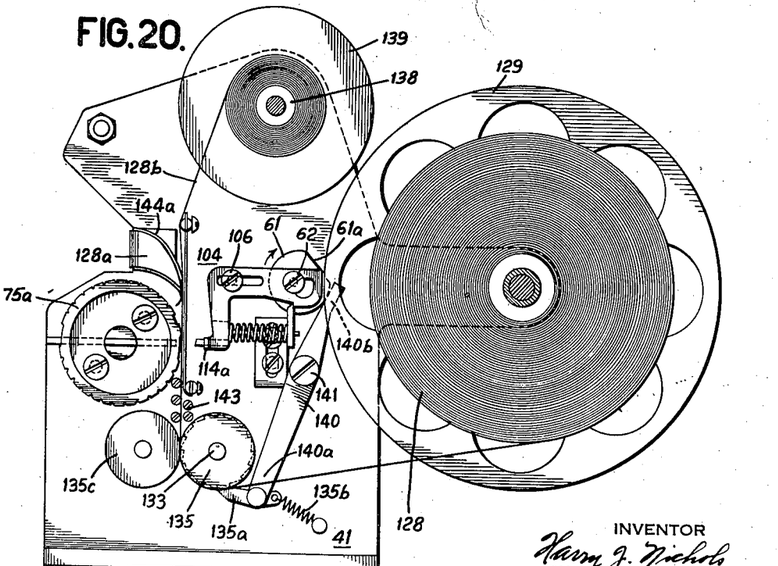
Fig. 20 is an end elevation of the device of Fig. 1, with parts omitted, illustrating the tape feed and printing mechanisms.

Mounted on the start-stop shaft 51 for rotation therewith and extending sequentially from the driven end to the front end thereof are a trip lever or #6-disk control cam 53 (Fig. 1), five sequence cams 54, 55, 56, 57, and 58 for sequentially operating the storage tumblers in accordance with the received signals, a tumbler reset cam 59, the #1-disk control cam 60, a tape feed control cam 61, and the print hammer trip crank 62 (Figs. 5 and 20). When stop pin 52 (Fig. 8) is held by its cooperating elements (see later) the driven cam element 50a is disengaged from the driving element of cam 50 in a manner well known in the operation of such eccentric clutches, and the shaft 51 remains stationary while motor 43 continues to rotate shaft 48 and the driving element of start-stop clutch 50. When pin 52 is released, the driving and driven clutch elements of clutch 50 engage each other and the start-stop clutch rotates one complete revolution, whereupon pin 52 is again engaged by its cooperating element in the normal course of operation.

Meshing with gear 46 is a gear 63 having a hub 64 attached by screw 64a to auxiliary shaft 65 journaled at one end in plate 42 and at the front end in the plate 41. Attached to the auxiliary shaft 65 by pins 65a (Fig. 3) are the driving elements 66a of a clutch arrangement comprising a floating gear 67 (Fig. 1). Driving elements 66a abut, respectively, friction rings 66b attached to the gear 67 on opposite sides thereof, whereby the gear 67 may be driven when not restrained from rotation and whereby said gear 67 floats over the driving elements 66a when it is held against rotation. A second similar floating gear 68 (Figs. 1 and 5) is similarly mounted on auxiliary shaft 65 adjacent the front end of said shaft.

Meshing with floating gear 67 is a gear 69 (Figs. 1, 11, and 12) mounted loosely by sleeve 69a on the printing or typewheel shaft 70, journaled at one end in plate 42 and at the front end in plate 41. Sleeve 69a is attached to the #6-disk of the accumulator 71 for rotation of and control of said disk as will be described in detail later. A pin 69b attached to gear 69 is controlled by cooperating stop means as will be described in detail later.

Meshing with floating gear 68 is a gear 72 (Figs. 1, 11, and 12), carrying a pin 72b controlled by cooperating stop means as will be described in detail later. Gear 72 is mounted on and fastened to the hub 73 of the #1-disk, which hub is fastened by pin 74 to shaft 70 for rotation thereof when gear 72 is released as will be described later.

A combined typewheel and shift device 75 (Figs. 1 and 22) is attached to the front end of shaft 70 for rotation therewith and movement axially thereof as will be described later.

To enable the setting, printing and restoring cycles to be completed during a time interval corresponding approximately to one revolution of the start-stop shaft, the typewheel and the restoring #6-disk are run at slightly more than twice the speed of the start-stop shaft. By means of the auxiliary shaft 65 and by the proper choice of the gear ratios, the shaft 65 is driven at desired speed to produce the necessary speed of rotation of the setting disk, typewheel and resetting disk.

Figure 6:
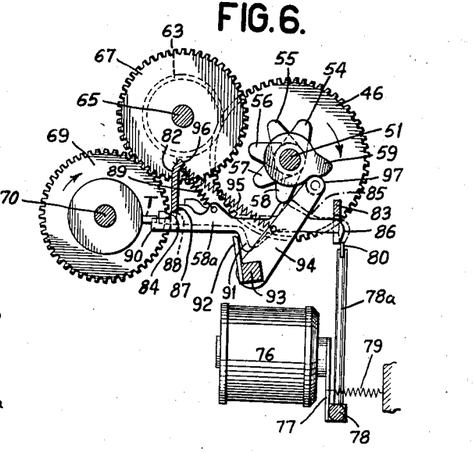
Fig. 6 is a fragmentary end elevation illustrating the operative elements of the selecting, resetting and accumulating mechanisms.

Referring to Fig. 6, an electromagnet 76, operated by the line signals, has an armature 77 mounted for oscillation on pivoted axle 78 and is biased by spring means 79 to the "off" or deenergized position. A pair of elongated cylindrical members 78a fastened to axle 78 carry at their ends the flutter vane or interposer 80.

Figure 8:
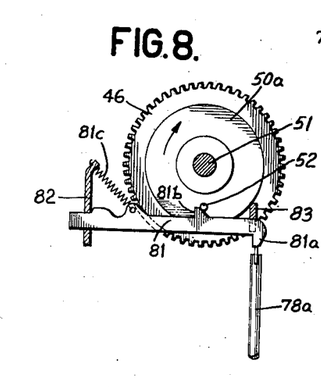
Fig. 8 is a fragmentary end elevation illustrating the control mechanism for the start-stop shaft of Fig. 1.

As will be seen by reference to Fig. 8, the interposer 80 is held in abutting relation to a start-stop trip lever 81, mounted for movement of oscillation in a vertical plane in the back comb 82 and for movement of translation with respect thereto. A front comb 83 provides lateral guides for the trip lever to maintain the oscillatory movement in a vertical plane. When the magnet 76 is energized, the vane or interposer 80 is held as illustrated in Fig. 8 with the hooked end 81a of the trip lever abutting the edge of the vane. In this position, the sloping lug 81b on the trip lever is in engagement with the stop pin 52 on the driven member 50a of the start-stop clutch 50. Upon reception of a start signal, magnet 76 is deenergized, the spring 79 snaps the vane 80 away from the hooked end 81a of lever 81, the lever 81 is cammed downwardly, as viewed in Fig. 8, by the action of pin 52 on lug 81b, permitting the pin 52 to pass the lug 81b, and the start-stop shaft 51 is started on its one complete rotation. As soon as the stop pin 52 has passed the lug 81b, the trip lever is restored to its operative stop position by means of the spring 81c.

Figure 7:
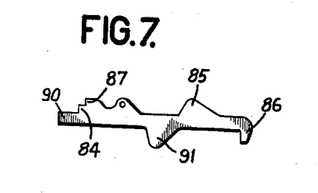
Fig. 7 is a detail view illustrating the storage tumbler selecting element of Fig. 6.

Referring to Figs. 6 and 7, the five sequence cams 54, 55, 56, 57, and 58 are arranged in a helical series axially and circumferentially of the start-stop shaft 51 and are rotatable therewith into operative position with five corresponding signal storage tumblers 54a, 55a, 56a, 57a, and 58a (Fig. 5), respectively.

Novel means are now provided comprising the storage tumblers themselves, whereby the signals received by the magnet 76 are sequentially effective and whereby no succeeding signal can be effective until the preceding signal has been completely stored. The storage tumblers are mounted in the back comb 82 and the front comb 83 for oscillation in a vertical plane and movement of translation in the direction of the tumblers themselves. Each tumbler is provided with a heel step 84 normally abutting the back guide comb and a sloping lug 85 cooperating with the respective sequence cam on the start-stop shaft. When magnet 76 is deenergized, vane 80 is held away from the position shown in Fig. 6 and upon rotation of the start-stop shaft, the lugs 85 cooperate with the respective sequence cams whereby the tumblers are oscillated about the heel step 84 as a pivot. Upon such oscillation, the hooked end 86 of the respective tumbler slides behind the interposer 80, thereby blocking the same from operation until the cooperating cam on the start-stop shaft has ridden past, even if the following signal has already begun and has produced its effect on magnet 76. Sufficient time for the storage of each respective signal section and operation of the respective cooperating cam is therefore provided by the novel mounting of the tumblers. Upon energization of the magnet 76, the vane 89 assumes the position illustrated in Fig. 6 which is such that when none of the tumblers is contacted by its respective cam, a slight clearance exists between the hooked ends 86 of the tumblers and the vane 80 but the vane 80 is located directly below the hooked ends 86. When any sequence cam on the start-stop shaft engages its corresponding sloping lug 85, the hooked end of the tumbler engages the end of vane 80 and the tumbler is oscillated, about the vane 80 as a pivot, until a heel step 87 on the tumbler is moved into alinement with the opening 88 in the back comb. The tumbler is thereupon jerked backwardly by a spring 89 until heel step 87 engages the back comb, as shown in Fig. 6, and the end 99 of the tumbler engages the wedge shaped end of a tripping pawl generally designated as T in Fig. 6 to trip the pawl and control the setting of an accumulator disk, so that the selected storage tumbler releases its respective accumulator disk. It is to be noted that even if a sequential signal attempts to operate the magnet 76, the armature is held by the sequence cam acting on the lug 85 holding the hooked end 86 tightly against the vane 80 and thereby holding the armature in place until the respective cam has cleared the tumbler lug. Only the "centers" of the succeeding signals will therefore be effective and the signal sections will each be properly sequentially stored without interference by the succeeding signal section, and in a simple and direct manner.

A lug 91 is provided on each tumbler which cooperates with a reset vane 92 carried by pivoted axle 93 oscillated by arm 94 which is biased counterclockwise by a spring 95 connected at one end to the arm 94 and at the other end to an ear portion 96 of the back comb. Arm 94 carries at the end thereof a follower roller 97 cooperating with the tumbler reset cam 59 on the start-stop shaft 51. At the proper time in the cycle of rotation of shaft 51, cam 59 engages follower 97, to actuate arm 94 which oscillates axle 93 to move the reset vane 92 against the lugs 91 of each of the tumblers which has been selected, to return the same to normal position with the heel step 84 thereof abutting the back guide comb 82.

Figure 9:
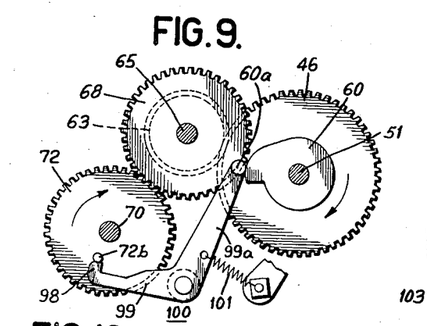
Fig. 9 is a fragmentary end elevation illustrating the operative elements of the driving and control mechanism for the printing wheel and accumulator.

Referring to Fig. 9, there is illustrated therein the trip means cooperating with the #1-disk control cam 69 on start-stop shaft 51 for controlling the rotation of the combined printing wheel and shift mechanism and the rotation of the novel accumulator means. Floating gear 68 in the same manner as floating gear 67 is constantly urged to rotate by the friction rings 66b (Fig. 3) as outlined above with respect to gear 67 and meshes with gear 72 mounted on and fastened to the printing or typewheel shaft 70. Pin 72b is provided on gear 72 cooperating with a lug 98 on one arm 99 of a bell-crank lever 100 to hold the gear 72 in stop position against the torque exerted by gear 68. The other arm 99a is biased clockwise by spring 101 and carries at its end a cam follower 60a cooperating with #1-disk control cam 69 of the start-stop shaft 51. When the "rise" of cam 69 engages follower 60a, the timing of which will be described later, the bell-crank 100 is rotated counterclockwise against the force of spring 101, the lug 98 releases pin 72b and the gear 72 is rotated by the floating gear 68 which is constantly urged into rotation as set forth above. As gear 72 rotates, it rotates the combined printing wheel and shift mechanism 75 (Fig. 1) in accordance with the setting of the novel accumulator means 71. If no disk on the accumulator means has been released, a couple is exerted on shaft 70 but its rotation is prevented until one of the accumulator disks is released as will now be described.

Figure 11:
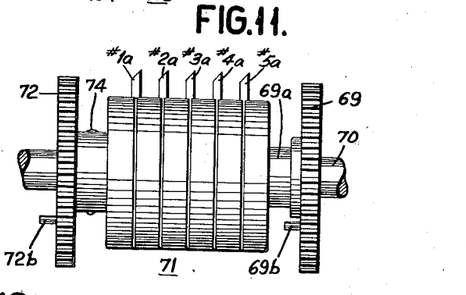
Fig. 11 is a side elevation illustrating the accumulator mechanism and the drive and control elements for the same.
Figure 12:
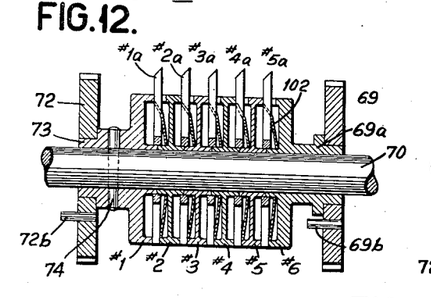
Fig. 12 is a side elevation in section, illustrating the construction of the accumulating mechanism of Fig. 11 and its connection to the printing wheel shaft.
Figure 13:
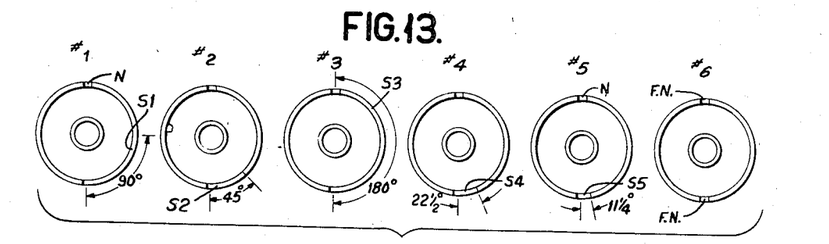
Fig. 13 is a detail end view of the respective disk elements of the accumulator device.
Figure 14:
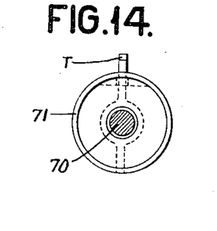
Fig. 14 is a detail end view illustrating the manner of mounting one of the control pawls of the accumulator upon the respective disks thereof.
Figure 15:
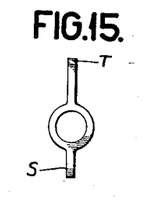
Fig. 15 is a detail end view illustrating the pawl element of Fig. 14.
Figure 16:
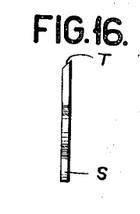
Fig. 16 is a side elevation of the element of Fig. 15.
Figure 17:
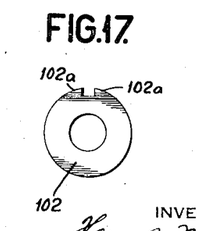
Fig. 17 is a detail end view illustrating the construction of the fingered spring disk of the accumulator as shown in Fig. 12.
Figure 18:
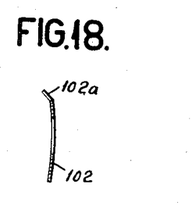
Fig. 18 is a side elevation of the element of Fig. 17.

Referring to Figs. 11 to 19 inclusive, the novel accumulator or translator means 71 comprises the five disks designated as #1-disk, #2-disk, #3-disk, #4-disk, and #5-disk, respectively. The disks are assembled on shaft 70 as illustrated in Figs. 11 and 12, with five tripping pawls #1a, #2a, #3a, #4a, and #5a, respectively, mounted on the shaft 70, as seen in Fig. 14, and located between the respective disks. Each pawl, as will be seen from Figs. 15 and 16, comprises a wedge shaped tripping portion T at one end cooperating with the extension 90 (Fig. 6) of the respective storage tumblers whereby the pawl is tripped or is moved to the right, as viewed in Figs. 11 and 12, against the spring force exerted by a fingered spring disk 102, mounted on the shaft 70 as seen in Fig. 12, with fingers 102a (Fig. 17) engaging the sides of the pawl. Each pawl is circular in outline and encircles the hub of the respective disk, as seen in Figs. 12 and 14. The opposite end of the pawls is designated as S and comprises the stop end of the pawl which cooperates with the slots S1, S2, S3, S4, and S5 formed in the circumference of the #1-disk, #2-disk, #3-disk, #4-disk, and #5-disk, respectively, (Fig. 13).

Referring to Fig. 13, each of the five disks is shown as provided with a circumferentially extending slot, the extent of each of the respective slots varying with the particular disk. The #1-disk is provided with a slot S1 extending 90° about its circumference and is therefore capable of rotating 8 type wheel units, the #2-disk has a slot S2 extending 45° and therefore can rotate 4 type wheel units, the #3-disk has a slot S3 extending 180° and therefore can be rotated 16 type wheel units, the #4-disk has a slot S4 extending 22½° and therefore can be rotated 2 type wheel units and the #5-disk has a slot S5 extending 11¼° and therefore can rotate but 1 unit. By combining the numerical number of "units" of the respective disks, any number from 1 to 31, inclusive, can be produced. If no signals are received, the typewheel will remain in zero position, even though the start-stop shaft is released, since no accumulator disk has been released. The typewheel will remain in its zero position until after the "print" period of the cycle whereupon the #6-disk is released to thereby release the typewheel and it will rotate 360° to return to its zero position. The #3-disk is assigned the 180° slot or in other words is capable of 16 units of rotation, in order to facilitate its use with the well known Baudot code. In the Baudot code, the "letters" shift function is represented by the signal combination 1, 2, 3, 4, 5 while the "figures" shift function is represented by the signal combination 1, 2, —, 4, 5. As will be described in detail later, the designation of the #3-disk as the 16 unit disk is essential when utilizing the Baudot code.

Figure 19:
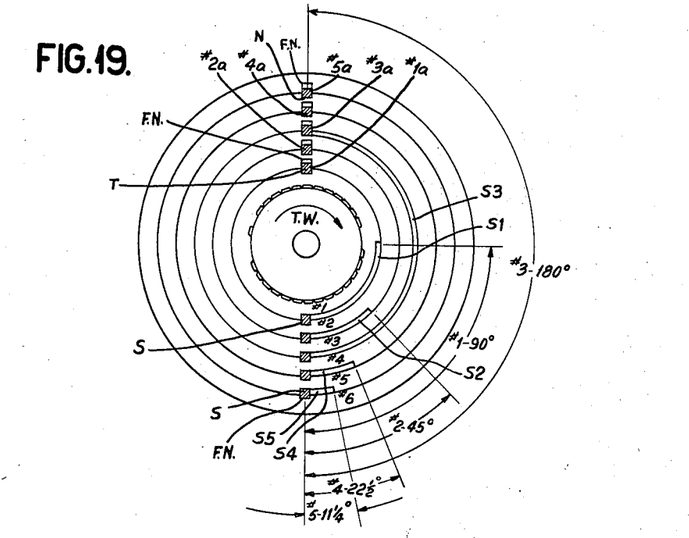
Fig. 19 is a view, partly diagrammatic, illustrating the method of operation of the accumulating mechanism.
Figure 22:
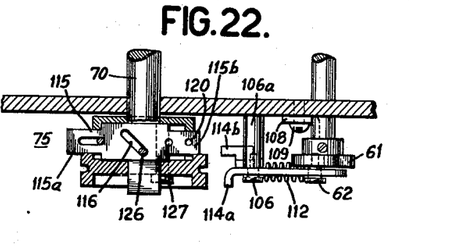
Fig. 22 is a sectional plan view including the mounting of the mechanism as illustrated in Fig. 21.
Figure 23:
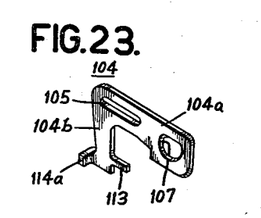
Fig. 23 is a detail perspective view illustrating the construction of the printing hammer or platen element.

As is seen in Figs. 12 and 22, the combined typewheel and shift mechanism is attached to the #1-disk by means of shaft 70, sleeve 73 and pin 74. The #1-disk accumulates all the angles of the tripped disks of higher number and therefore the typewheel will be rotated in accordance with the total accumulation. The #6-disk remains stationary during accumulation and is then set in rotation in the same direction as the #1-disk, to restore the accumulator to zero and to permit rotation of the typewheel in the same direction of rotation, back to the zero position. Referring to the partly diagrammatic illustration in Fig. 19, the description of the operation of the novel accumulator will be greatly simplified. In Fig. 19, it is assumed that the diameters of the respective accumulator disks have been progressively expanded beginning at the typewheel end. The typewheel 75 is designated as TW and clockwise rotation is assumed, as indicated by the arrow. The ends T of pawls #1a to #5a, inclusive, are indicated in their unoperated or untripped position, wherein they are resiliently positioned in a notch N of the corresponding disk and partly within a fitting notch FN in the successive disk, to thereby lock the disks against rotation.

Upon actuation of the tumbler 58a (Fig. 5) corresponding to the pawl #1a, the upper end T of pawl #1a, as viewed in Fig. 19, will be moved upwardly (to the right, as viewed in Fig. 11) until the said upper end is located entirely in the fitting notch FN in the #2-disk. The #1-disk is thereupon released and is prepared for rotation by the float gear 68 (Fig. 9) rotating the gear 72 (when 72 is released by operation of the bell-crank 100) which gear 72 thereupon rotates the #1-disk by means of its sleeve 73 (Fig. 12) to produce rotation of the #1-disk clockwise as viewed in Fig. 19. The #1-disk will therefore rotate past the end S of the #1a pawl until the end of the 90° slot S1 in the #1-disk abuts end S of pawl #1a whereupon rotation is stopped. Upon release of the #2-disk by tripping of pawl #2a by its corresponding tumbler 57a, the upper end of pawl #2a will be moved upwardly as viewed in Fig. 19 into the fitting notch FN of the #3-disk and the #2-disk is therefore free to rotate 45°. Such rotation is produced by a further rotation of #1-disk which through end S of #1a pawl drives #2-disk. When the #3-disk is released upon tripping of pawl #3a by tumbler 56a, it is rotated 180° by means of #1-disk and #2-disk; when the #4-disk is released upon tripping of pawl #4a by tumbler 55a it is rotated 22½° and when the #5-disk is released upon tripping of pawl #5a by tumbler 54a it is rotated 11¼°. This angular rotation is completely accumulated by the #1-disk which rotates the #2-disk, while #2-disk in turn rotates the #3-disk, etc. When all the pawls #1a to #5a, inclusive, have been tripped and the respective disks have been rotated, the #1-disk and the typewheel will have rotated a total of 348¾° or 31 "units" of the typewheel, or in other words, the typewheel will have rotated to the "letters" shift position, as will be explained later.

If, for example, the #3a pawl, only, had not been tripped; the #1-disk through its rotation with the released disks would rotate only 15 units since rotation of the #1-disk is prevented for 16 units when the #4-disk is not released. This condition is represented in the Baudot code by 1, 2, —, 4, 5. This rotation of the typewheel would bring it to the "figures" shift position, as will be explained later.

If we assume as before that the #1-disk is released but if it be further assumed that the #2-disk, the #3-disk, the #4-disk and the #5-disk are not released because storage tumblers 57a, 56a, 55a, and 54a, respectively, are not actuated to abut and trip the respective pawls of the accumulator, or in other words, assuming the reception of the Baudot code signal 1, —, —, —, —, the typewheel would be rotated 8 units and the letter E would be presented on the typewheel at the printing point. It has been assumed that the #6-disk is held stationary while the accumulation is taking place.

After all of the pawls have been selectively tripped or left unactuated in accordance with the signal code received, the #6-disk is released for rotation in the same direction as the typewheel and the selectively tripped disks whereby the typewheel is returned to its zero position and the accumulator is reset to zero.

Figure 10:
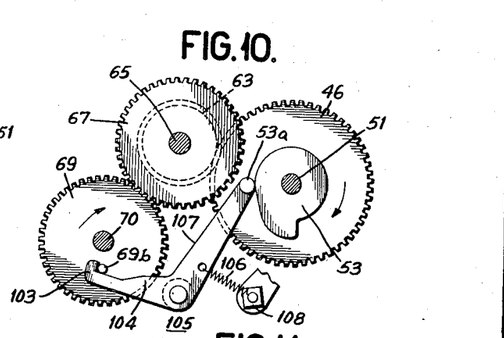
Fig. 10 is a fragmentary end elevation illustrating the operative elements of the driving and control mechanism for resetting the accumulator mechanism and printing wheel.

Referring to Fig. 10, the floating gear wheel 67 is constantly urged counterclockwise, as shown, by the friction disk means 66b as seen in Fig. 3. Gear wheel 67 is held in mesh with gear 69 carrying the lock pin 69b (see also Fig. 11). Pin 69b is engaged by a lug 103 on the end of arm 104 of the bell-crank lever 105 which is constantly urged in a clockwise direction by spring 106 attached to arm 107 at one end thereof and to a fixed point 108 at the other end thereof. The free end of arm 107 carries a cam follower roller 53a cooperating with the #6-disk control cam 53 on the start-stop shaft 51.

After each of the tumblers has been selectively set by the sequence cams 54, 55, 56, 57, and 58 cooperating with the tumblers 54a, 55a, 56a, 57a, and 58a, respectively, and with the vane 80 of the electromagnet 76, and after each of the pawls #1a, #2a, #3a, #4a, and #5a has been selectively tripped and the respective disks released and after the #1-disk has been rotated an angular amount equal to the sum of the circumferential angular extents of the slots of the selectively released disks, the rise of cam 53 engages follower roller 53a (Fig. 10) and rotates bell crank 105 counterclockwise against the force of spring 106, so that lug 103 releases pin 69b and gear 69 is thereupon started in rotation by the floating gear wheel 67. Such rotation of gear 69 rotates the sleeve 69a (Fig. 12) to thereby rotate the #6-disk in the same direction as that in which the #1-disk and the selectively released disks were previously rotated. Upon such rotation of the #6-disk, the remaining disks are allowed to rotate and the typewheel will continue its rotation until it has completed 360° of rotation. If, as indicated above, the typewheel has already been rotated 348¾° by the release of all of the accumulator control disks, or 31 units in all, the typewheel will now rotate 11¼ more degrees, or an additional unit, as the #6-disk is rotated and the typewheel will then be stopped in its zero position by engagement of the stop 72b on gear 72 with the lug 98 on bell-crank 100 (Fig. 9), which stop and lug permit one complete revolution only of the typewheel shaft.

Referring again to Fig. 19, it is seen that as the #6-disk is rotated, it takes up the slack between the stop ends S of the pawls and the left hand end of the arcuate slots in each disk. Since the wedge end T of pawl #5a was previously moved entirely into the fitting notch FN of the #6-disk and since the #5-disk was at that time rotated, the notch N in the #5-disk, into which end T of pawl #5a normally fits, is not alined with the T end of the #5a pawl. Rotation of the #6-disk thereupon rotates pawl #5a clockwise bodily so that the stop end S thereof is removed from abutment with the right hand end of the circumferential slot S5, as viewed in Fig. 19, and is moved clockwise away therefrom until it engages the left hand end of said slot, whereupon the end T of pawl #5a will be alined with the notch N in the #5-disk and will enter the notch under the stress of spring disk 102 and engage the #5-disk. Consequently, the #5-disk and the #6-disk will rotate together until the slack is taken up in the #4-disk and this same process is repeated with respect to each of the lower numbered disks. Eventually all the disks assume the position as illustrated in Fig. 19 and the #6-disk having rotated 360°, pin 69b (Fig. 10) engages lug 103 and the rotation of the #6-disk is stopped and the accumulator has been reset for another accumulation to be run up thereon.

Figure 24:
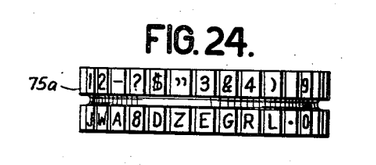
Fig. 24 is a plan view of the printing wheel.
Figure 25:
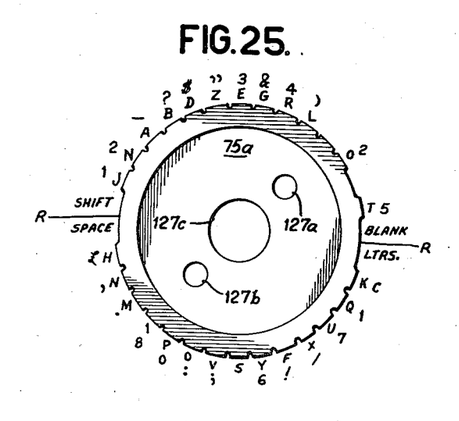
Fig. 25 is an end elevation of the printing wheel.
Figure 26:
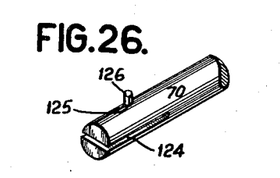
Fig. 26 is a detail perspective view of the printing wheel shaft slot and pin means for mounting and controlling the shift mechanism.
Figure 27:
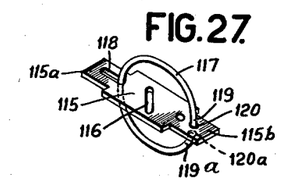
Fig. 27 is a detail perspective view illustrating the construction and assembly of the shift actuating mechanism.
Figure 28:
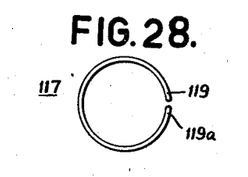
Fig. 28 is a detail end view of the ring shaped spring element of Fig. 27.
Figure 29:
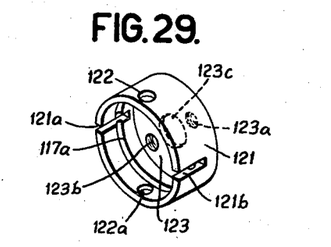
Fig. 29 is a detail perspective view of the casing of the shift mechanism.

Referring to Figs. 20 to 25, inclusive, there is illustrated therein, the novel mechanism for effecting printing in conjunction with the typewheel, which wheel is disclosed in detail in Figs. 24 and 25. The typewheel 75a is provided with two circumferential bands of type characters, placed side by side axially of the wheel, there being 31 angular printing positions, in addition to the zero position. Five of these positions relate to printing functions, in which positions, the perimeter of the typewheel is cut back to form a recess R so that upon operation of the printing hammer 104 (Fig. 20) the hammer will not strike the typewheel.

Figure 21:
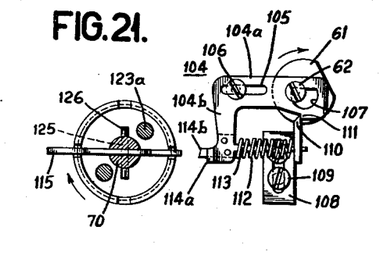
Fig. 21 is a detail end view of the printing and shift control mechanism.

Printing hammer 104 (Fig. 21) comprises a bell-crank having one arm 104a thereof longer than the other printing arm 104b thereof. Arm 104a is provided with an elongated slot 105 into which is inserted the headed member 106 carried by cylindrical member 106a (Fig. 22) fastened to plate 41. Member 106 serves as a pivot about which the printing hammer or platen is oscillated. A generally semi-circular opening 107 is provided adjacent the free end of the arm 104a. A headed pin 62 (Figs. 5 and 21) forming the trip crank for the printing arm projects through opening 107 and is eccentrically fastened to the tape feed cam 61. A right angle bracket 108 is fastened to plate 41 by a screw 109 and carries at the upwardly extending end thereof a wedge shaped latch 110 cooperating with a notch 111 on arm 104a, to hold the printing arm locked in cocked position as shown in Fig. 21. A compression spring 112 is fastened to the latch 110 at one end thereof and surrounds an extension 113 on the arm 104b, which spring when compressed, as illustrated in Fig. 21, urges the bell-crank in a clockwise direction, which bell-crank, however, is held in position by latch 110 cooperating with notch 111. A platen or hammer head 114a extends to the left of arm 104b as viewed in Fig. 23, the platen being alined with the proper band of type characters by the shift mechanism, as will be described later. A shifting lug 114b extends to the right (or upwardly as viewed in Fig. 22) and provides means for producing shifting, upon actuation of the hammer at one of the shift positions of the typewheel, as will be described later.

As seen in Fig. 21, the printing hammer is cocked and held clear of the typewheel. The start-stop shaft is rotating clockwise as indicated by the arrow and has 90° of rotation remaining to complete one revolution thereof. The trip crank 62 is so positioned that it is about to lift the print hammer clear of the latch 110. When the hammer 104 is so released from latch 110, the compression spring 112 drives the print hammer 104 towards the typewheel and the platen 114a forces the tape (Fig. 20) against the selected type character, thereby producing printing of the selected character upon the tape. The crank pin continues to raise the arm 104a, which thereby removes platen 114a from the type character and permits return of the typewheel to zero as described above. The crank pin, upon the beginning of the next cycle of rotation of the start-stop shaft, pulls the arm 104a to the right during the first 90° of rotation thereby dropping the notch 111 back of the latch 110, the hammer remaining cocked in this position during the next 180° of rotation, at the end of which time the crank and hammer are as illustrated in Fig. 21.

Referring to Figs. 21 to 29 inclusive, novel means are illustrated therein for axially shifting the combined typewheel and shift mechanism 75 to aline the desired band of type with the printing hammer lug 114b. A radially slidable tongue member 115 having arms 115a and 115b and an elongated opening 116 extending diagonally thereof, is provided with a resilient split ring 117 having one side thereof inserted into an elongated opening 118 in arm 115a of the tongue. The free ends 119 and 119a of said spring abut one of two pairs of cooperating top and bottom depressions each comprising a top depression 120 and a bottom depression 120a directly beneath, the depression of each pair being formed in the top and bottom of arm 115b respectively.

A hollow circular hub 121 (Fig. 29) is provided with slots 121a, 121b, into which the arms 115a and 115b, respectively, are inserted. A circumferentially extending groove 117a is formed in the interior of hub 121 to receive the resilient ring 117. Openings 122, 122a are formed in the circumference of the hub 121 and threaded openings 123a and 123b and a shaft opening 123c are formed in the end wall 123 thereof for purposes which will be defined later.

A slot 124 is formed in the end of shaft 70 (Fig. 26) and an opening 125 is provided in said shaft to receive a pin 126 therein.

Screw holes 127a and 127b and a shaft opening 127c (Fig. 25) are provided in the typewheel 75a which openings are so located as to aline with openings 123a, 123b and 123c, respectively, of the hub 121.

Hub 121 is mounted upon shaft 70 and the slidable tongue 115 is inserted into slot 124 in shaft 70 with the ends 115a and 115b located in the slots 121a and 121b, respectively, of hub 121, and the spring 117, mounted on tongue 115, internesting in the circumferential groove 117a in the hub. Pin 126 is inserted through one of the openings 122, 122a and driven through the diagonal slot 116 and into opening 125 in shaft 70 to thereby operatively assemble the hub, tongue, ring and shaft together. Typewheel 75a is attached to the hub by screws 127, passing, respectively, through the openings 127a, 127b alined, respectively, with the threaded openings 123a, 123b.

The typewheel is indexed to the "figures" position or the "letters" position by the Baudot code signals 1, 2, –, 4, 5 and 1, 2, 3, 4, 5, respectively. Since the translator or accumulator mechanism 71 permits the typewheel to rotate 16 units or 180° in response to signal –3– of the Baudot code, it is seen that the "figures" and "letters" positions are 180° apart or in other words, are diametrically opposite. Upon receipt of the "letters" shift signal at the receiver, the accumulator 71 permits the typewheel to rotate until it assumes the "letters" position. The typewheel is presumed to be in such a position that the printing platen 114a is alined with the figures band of characters on the typewheel. After the rotation of the typewheel to the "letters" position and upon actuation of the printing hammer, the platen 114a enters a blank space on the typewheel and the lug 114b abuts the edge of arm 115b thereby moving the slidable tongue 115 to the left as viewed in Figs. 22 and 27, the sides of the slot 116 riding on the pin 126 thereby simultaneously shifting the tongue 115 and the combination printing and shifting mechanism 75, axially upward, as viewed in Fig. 22, until the pin 126 abuts the bottom right hand end of slot 116, whereupon the letters band of characters is alined with the platen 114a.

When a "figures" shift signal is received sequentially to the above, the end 115a of tongue 115 will be rotated into alinement with the lug 114b and the combined printing and shifting mechanism 75 will be moved axially downward, as viewed in Fig. 22, to aline the figures band of characters with the platen 114a.

Referring to Figs. 1, 2 and 20, there is illustrated therein novel means for feeding the tape from the idler feed spool, across the printing face of typewheel 75a and across the receiver mechanism to the tape rewind spool. Means are also provided for separately taking up the carbon after the respective carbon and paper tapes of the duplex tape have together passed between the printing elements.

A roll of duplex tape 128 comprising the paper tape 128a (Fig. 1) and carbon tape 128b (Fig. 20) is wound upon an idler spool 129 mounted by hubs or sleeves 129a for rotation on a rewind shaft 130 journaled in plates 41 and 42. A grooved pulley 131 is fastened to shaft 130 for rotation thereof, well known snap fastening means being provided between the pulley 131 and the shaft 130 whereby the pulley can be easily detached to allow removal of idler spool 129. A grooved pulley 132 is mounted on and connected to a shaft 133 upon which are also sequentially mounted, in back of pulley 132, a grooved pulley 134 and a feed ratchet wheel 135, both attached to the shaft. A well known type of spring tension belt 136 is connected between pulleys 131 and 132 whereby the pulley 131 is rotated upon rotation of pulley 132 on shaft 133. A grooved pulley 137 is mounted on shaft 138 carrying a carbon take up spool 139. A flexible belt 136a connects pulleys 134 and 137 whereby shaft 138 is rotated upon rotation of shaft 133 by the ratchet wheel 135 as will now be described.

Referring to Fig. 20, a pawl 135a is pivotally mounted on the end 140a of an elongated follower lever 140 pivoted at 141. The end 140b of the follower lever abuts the tape feed cam 61 and is resiliently held in contact therewith by means of spring 135b attached to pawl 135a at one end and to the plate 41 at the other end thereof. As the start-stop shaft 51 (Fig. 5) rotates thereby rotating the tape feed cam 61, cam 61 carrying the trip crank 62 rotates to release the print hammer as above described and upon continuing the rotation thereof a flat side 61a of cam 61 is alined with the follower lever end 140b. Spring 135b thereupon rotates lever 140 counterclockwise and ratchet 135a is placed behind a succeeding tooth on ratchet wheel 135. As cam 61 continues its rotation, the flat side 61a thereof is removed from contact with lever end 140b and the full circumference of the cam engages 140b whereby lever 140 is rotated clockwise to move the ratchet pawl 135a to the left to thereby advance ratchet wheel 135 one tooth. Rotation of wheel 135 rotates shaft 133 and pulleys 132 and 134 (Fig. 2) thereby rotating pulleys 129 and 137, respectively, to rotate the rewind shaft 130 and the carbon take up spool 139. The far side of rewind shaft 130 has removably attached thereto a tape rewind wheel 142 (Fig. 1).

The duplex tape is fed from idler spool 129, between the feed surface of ratchet wheel 135 and the tape jockey roller 135c, between guides 143, and between the typewheel 75a and the platen 114a. After passing between the typewheel and the platen, the carbon and paper tapes are separated and the paper tape 128a is fed across the guide surface 144a, across the receiver to guide surface 144b (Fig. 1), and thence to the rewind spool 142 where the message is stored. The carbon tape 128b however, is fed upwardly from the typewheel (Fig. 20) to the carbon take up spool 139 at the same time that the record tape 128a is being fed across the receiver to the rewind spool 142 as above described. The sizes of the respective pulleys are so chosen that the rewind and take-up spools always tend to wind up the paper tape and carbon tape faster than the duplex tape is fed for printing.

Figure 30:
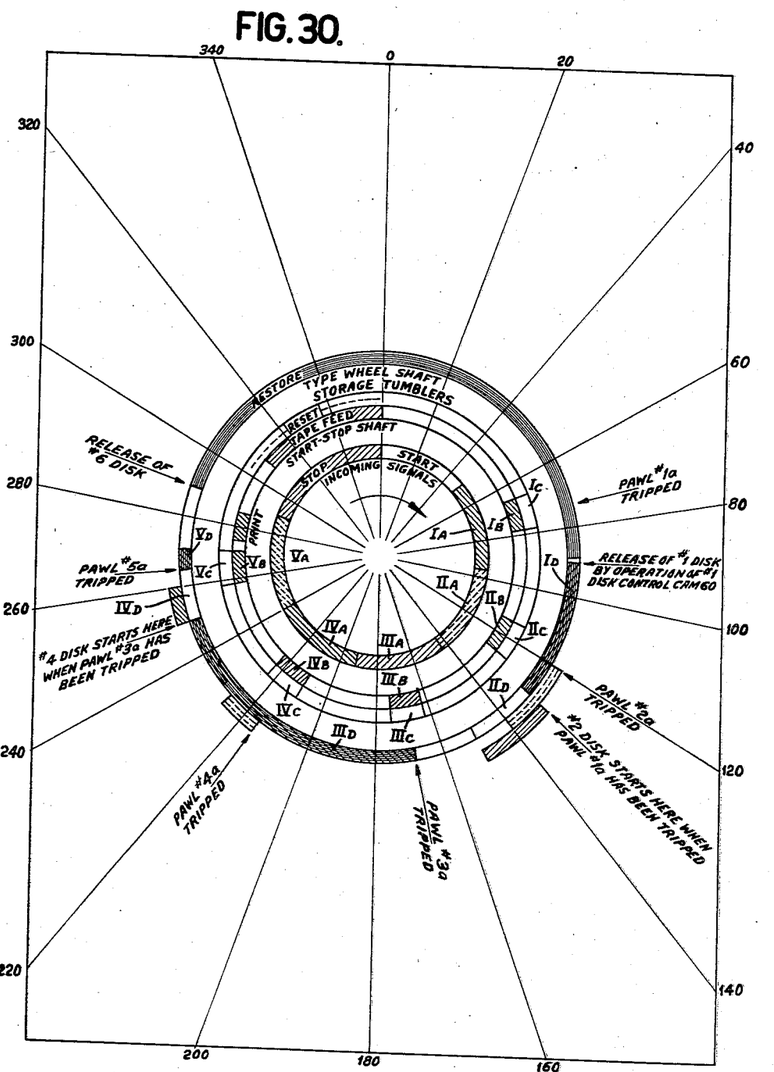
Fig. 30 is a diagram illustrating graphically the timing of the operations of the various mechanisms of the novel receiver for printing telegraphy.

The operation of the device and particularly the sequential relationship of the operation of the various elements will be more clearly understood when described in connection with the timing diagram of Fig. 30. The angular amounts of rotation of the respective elements are all referred to the rotation of the start-stop shaft and since the typewheel and accumulator disks revolve more rapidly than the start-stop shaft as explained above, the extent of their angular motion is illustrated in terms of rotation of the start-stop shaft. Upon receipt of the start element or section of the signal, which in the present instance, is deemed to be a deenergized condition of the line or an "off" condition represented by "start" in Fig. 30, electromagnet 76 (Fig. 6) is deenergized, armature 78a (Fig. 8) is released, the start-stop trip lever 81 releases pin 52 and the start-stop shaft 51 begins to rotate, the timed relation being as illustrated in Fig. 30. Upon receipt of the first signal element or section which will be assumed to be a condition of energization of the line or an "on" condition, as represented by Ia in Fig. 30, the storage tumbler 58a, represented by Ic in Fig. 30 and controlling the #1-disk of accumulator 71, will be held by armature 78a in position to be operated by sequence cam 58, represented by IB in Fig. 30, to force lug 90 (Fig. 6) of tumbler 58a against wedge element T of pawl #1a to trip the pawl which when gear 72 is released, will release the #1-disk for 90° of rotation thereby permitting a 90° rotation of the typewheel, represented in terms of rotation of the start-stop shaft by ID of Fig. 30. Upon tripping of the #1a pawl, as is seen from Fig. 30, the #1-disk does not rotate and the typewheel shaft is not immediately released for rotation, since control cam 60, called the #1-disk control cam, on the start-stop shaft (Fig. 9) does not operate bell-crank 100 through cam follower 60a to release stop 98 from engagement with stop pin 72b until later, the release being timed to occur after the restoring cycle is completed whereupon floating gear 68 drives gear 72 to rotate the typewheel shaft and the typewheel under the control of the released #1-disk as described above. The operation of the #1-disk control cam 60 is timed to release the #1 disk as indicated in Fig. 30. If all of the signal elements from 1 to 5 inclusive are "on" signals, the storage tumblers 57a, 56a, 55a, and 54a represented in Fig. 30 by IIc, IIIc, IVc, Vc, respectively, will be actuated at the center of signal elements IIA, IIIA, IVA, VA, respectively, by their respective sequence cams 57, 56, 55 and 54 represented in Fig. 30 as IIB, IIIB, IVB and VB, respectively, to thereby trip the pawls #2a, #3a, #4a and #5a, respectively, as indicated in Fig. 30. While pawl #2a is tripped as indicated in Fig. 30, since we have assumed that pawl #1a was also tripped, and since the #2-disk is not driven by the #1-disk, until the #1-disk has rotated 90° (Fig. 19) the #2-disk will not start its rotation until the rotation of #1-disk is completed as illustrated in Fig. 30. The #3-disk will begin its rotation, however, as soon as pawl #3a is tripped, as indicated in Fig. 30, since the #2-disk has completed its rotation, before pawl #3a is tripped.

Pawl #4a, however, is tripped before the #3-disk has completed its rotation and therefore the #4-disk will not begin its rotation until the #3-disk has fully completed its 180° rotation as illustrated in Fig. 30.

Upon tripping of pawl #5a, the #5-disk will immediately begin its rotation since the rotation of the #4-disk is completed a short time before pawl #5a is tripped, which tripping occurs at the center of signal element or section VA as illustrated in Fig. 30. After the #5-disk has been released and the typewheel shaft rotated the 11¼° pertaining to this disk, the shaft is momentarily stopped by the stop end S of pawl #5a engaging the end of the circumferential slot S5 in the #5-disk.

Shortly thereafter the #6-release cam 53 (Fig. 1) releases pin 69b on gear 69 connected to the #6-disk, to thereby permit floating gear 67 to rotate gear 69 (Fig. 11), sleeve 69a and the #6-disk to thereby restore the typewheel and the accumulator disks.

Just prior, however, to the release of the #6-disk, as is seen from the diagram of Fig. 30, the trip crank 62 (Fig. 21) releases the trip hammer 104 and the platen 114a forces the duplex tape 128 against the selected letter or figure character to print the same upon the record tape 128a. The trip crank thereupon removes platen 114a from engagement with the tape whereupon the #6-disk driven by its sleeve 69a and the gear 69, begins the rotation of the typewheel as explained above in its same direction of rotation to the zero position thereof where it is stopped by pin 72b engaging stop 98 (Fig. 9) and likewise rotation of #6-disk restores the accumulator disks to their initial position during the "restore" part of the cycle as indicated in Fig. 30.

While the accumulator disks are being restored, as is seen from Fig. 30, the flat part 61a (Fig. 20) of cam 61 permits movement of pawl 135a to the right and thereupon cam 61 moves the pawl to the left to actuate the ratchet wheel 135 to advance the tape.

During this same part of the cycle, cam 59 (Fig. 6) actuates cam follower 97 and lever 94 to operate the reset vane 92 to reset the storage tumblers as indicated by "reset" in Fig. 30 and the start-stop shaft is stopped shortly thereafter by pin 52 (Fig. 8) engaging with lug 81b on the start-stop trip lever 81.

The #6-disk has meanwhile been restoring the accumulator disk, and as is seen from Fig. 30 this restoration continues even after the start-stop shaft has been stopped and subsequently released for rotation on its succeeding cycle and such restoration continues up to the time that sequence cam 58 again engages storage tumbler 58a in the middle of the first section Ia of the succeeding signal. An overlap is therefore provided so that the operation of the receiver can be started while a translator or accumulator is being restored to zero position.

Novel means are therefore provided whereby a simple compact receiver for printing telegraphy is provided, wherein the signals are restrained in their effect to their sequential occurrences, wherein restoration of the typewheel and accumulator occurs in the same direction of rotation as during the setting thereof, and wherein an extremely simple and effective mechanism is provided.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a device of the character described comprising a double typewheel, means for bringing said wheel to a stop in a selected position, printing means mounted for movement radially of said typewheel and into engagement therewith, and means for axially shifting said wheel including a radially movable member positioned automatically in the path of movement of said printing means to be moved radially thereby in said selected position of said typewheel, and means effective upon radial movement of said member by said printing means to change the radial movement of said member to axial movement thereof to produce axial shift of said wheel.

2. In a device of the character described comprising a double rotatable typewheel, means for selectively stopping the rotation of said wheel, shift means mounted to rotate with and impart shifting movement to said typewheel, and power driven printing means movable with respect to said typewheel and engageable with said shift means, upon stoppage of said typewheel in a preselected position, to supply power to operate said shift means.

3. In a device of the character described comprising a double typewheel, a printing member movable toward and away from said typewheel, a movable member actuated by movement of said printing member, means mounting said movable member for motion having components diametrically and axially of said typewheel upon actuation of said movable member, and means for delivering only said axial component to said typewheel.

4. In a printing telegraph comprising a shaft, a double typewheel mounted for rotation with said shaft and relative movement axially of said shaft, a printing member movable toward said typewheel and generally radially of said shaft, and a diagonally slidable member actuated by movement of said printing member and cooperating with said wheel and shaft to produce relative axial movement therebetween.

5. In a printing telegraph comprising a shaft, a double typewheel mounted for rotation with said shaft and relative movement axially of said shaft, a power driven printing element movable toward said typewheel and generally radially of said shaft, and means for directly converting the radial movement of said printing element to relative axial movement only of said shaft and wheel.

6. In a device of the character described comprising a shaft, a typewheel mounted for axial movement on said shaft, a slidable member formed with a diagonal opening, means mounting said member on said shaft for movement radially thereof, means on said shaft cooperating with the walls of said diagonal opening for converting the radial movement of said member to axial movement, and means transmitting said axial movement to said typewheel.

7. In a device of the character described comprising a shaft, a typewheel movably mounted on said shaft, a slot extending axially of said shaft, a slidable member in said slot, an opening in said member extending at an acute angle to said shaft, means on said shaft extending into said opening, and means interconnecting said typewheel and member.

8. In a printing telegraph comprising a shaft, a typewheel movably mounted on said shaft, a slot extending axially of said shaft, a slidable member in said slot, an opening in said member extending at an acute angle to said shaft, means on said shaft extending into said opening, an opening in said member extending radially of said shaft, impressions on the sides of said member, a circular split ring having one side in said radial opening and the ends thereof selectively engageable in said impressions, means holding said ring in position with respect to said shaft, and means transmitting the movement of said slidable member to said typewheel.

9. In a printing telegraph comprising a shaft, a member mounted for movement axially and radially of said shaft, a typewheel mounted for axial movement on said shaft, means on said shaft cooperating with said member and said wheel to maintain them in assembled relation with said shaft, means on said member cooperating with said shaft means for converting radial movement of said member to axial movement, and means transmitting said axial movement to said wheel simultaneously with said radial movement.

10. In a printing telegraph, a shaft, a slot in said shaft, a radially movable member in said slot, type means carried by said shaft and connected to said member, and means on said shaft engaging means on said member and constraining said member to move axially, simultaneously with its radial movement, to thereby impart axial movement to said type means.

11. In a printing telegraph, a shaft, a slot in said shaft, a type member mounted on said shaft for movement thereon, a slidable member extending radially through said slot and connected to said type member, an elongated diagonally extending aperture in said slidable member, and means on said shaft engaging the sides of said elongated aperture.

HARRY J. NICHOLS.